Dec. 30, 1924.
J. C. PELTON
1,521,316
APPARATUS FOR PRODUCING CONCRETE CASTINGS
Filed Nov. 21, 1921      3 Sheets-Sheet 1
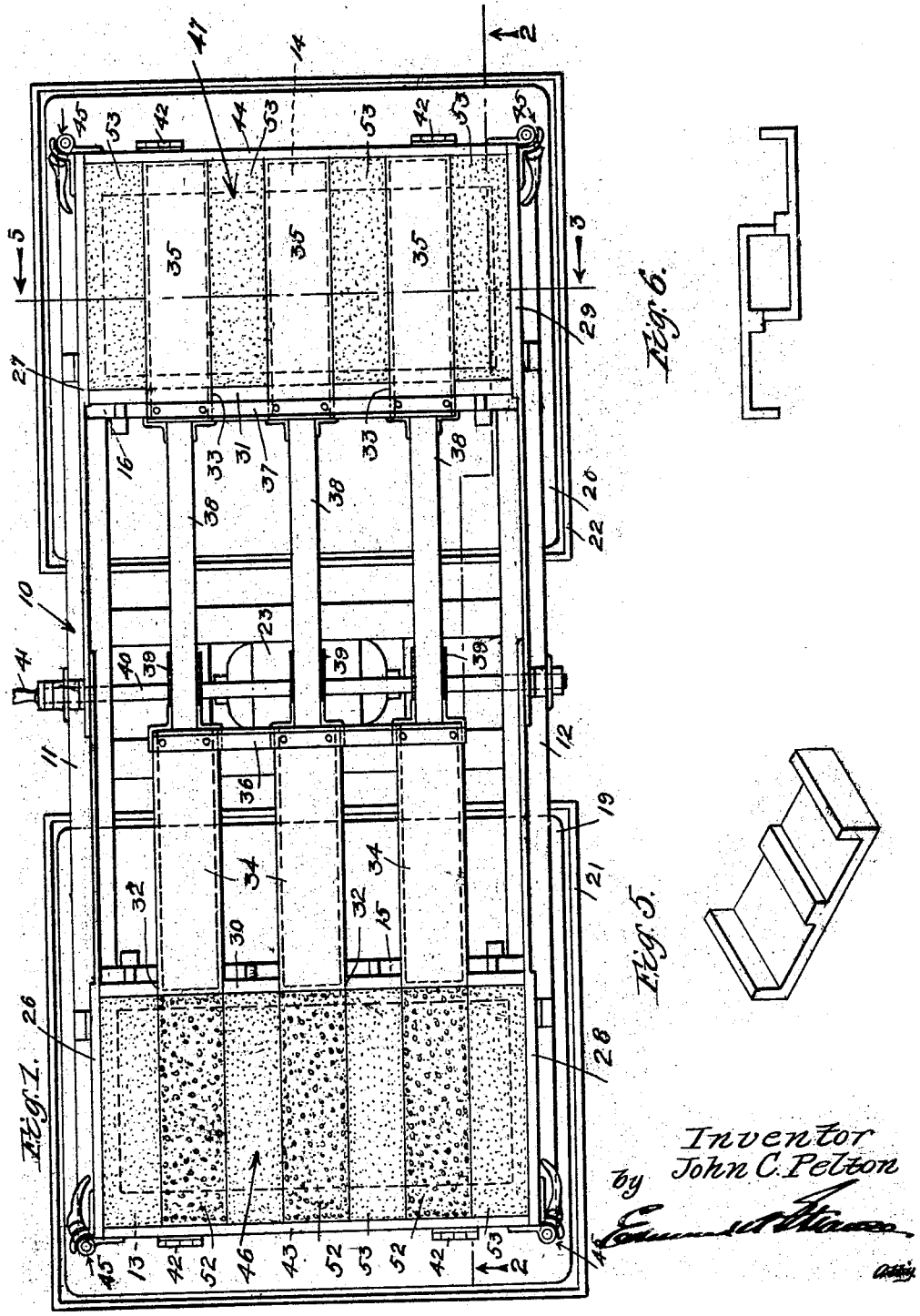
Inventor
John C. Pelton

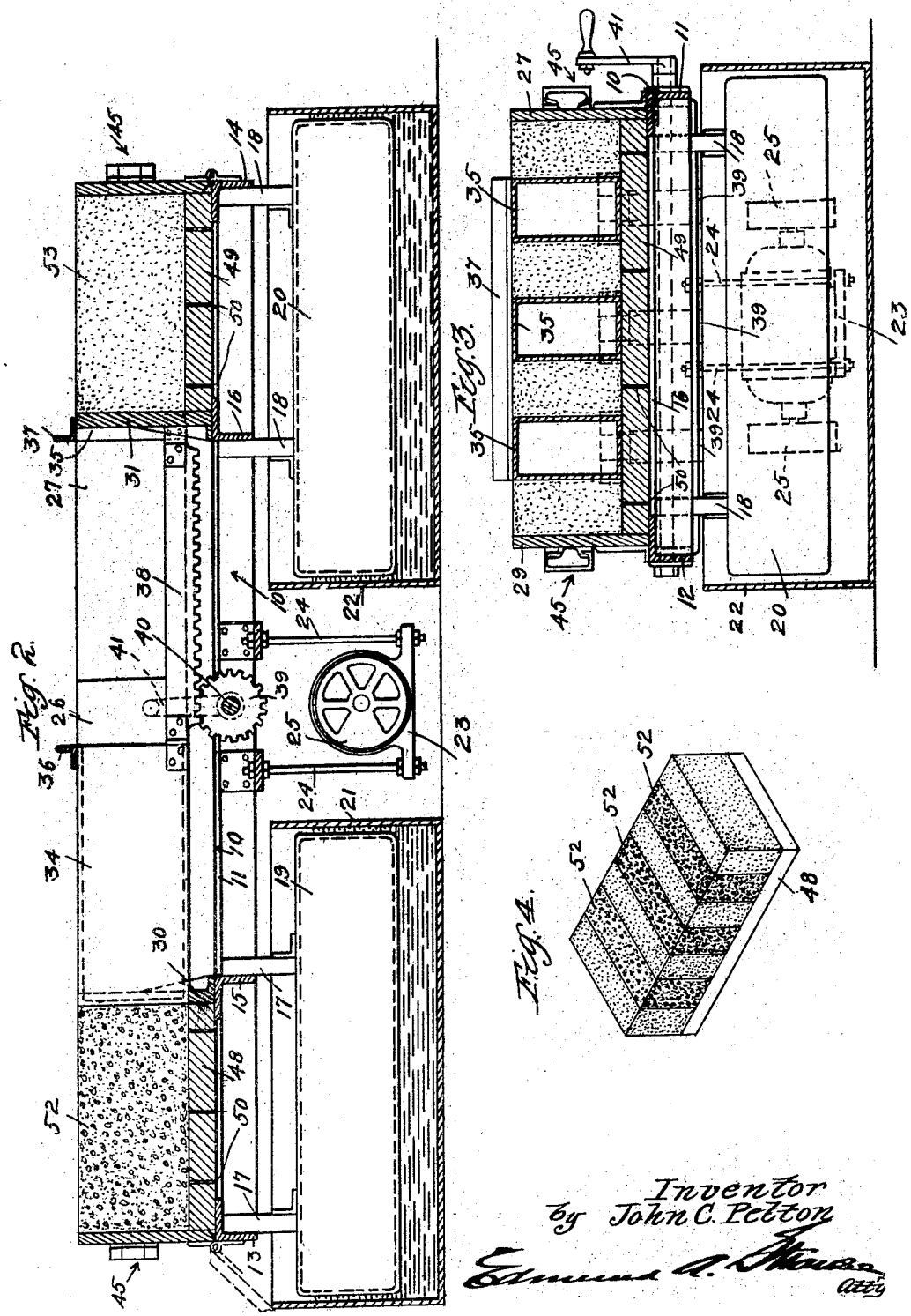

Dec. 30, 1924.   1,521,316
J. C. PELTON
APPARATUS FOR PRODUCING CONCRETE CASTINGS
Filed Nov. 21, 1921   3 Sheets-Sheet 3
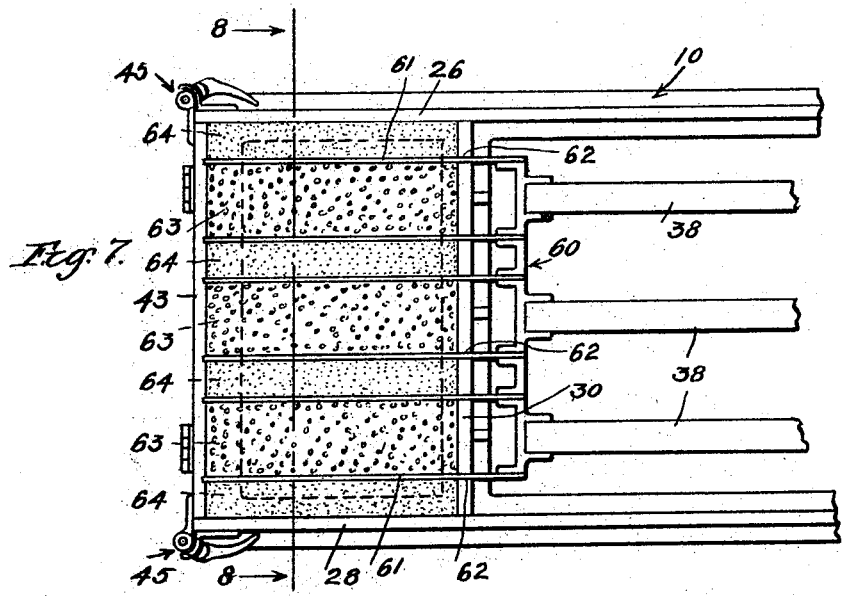
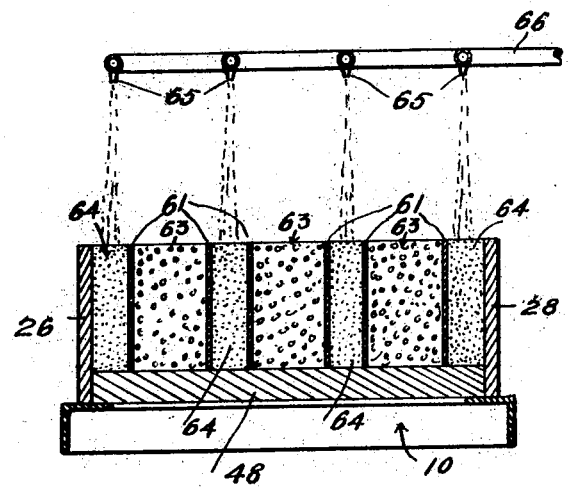
Inventor
John C. Pelton
by Patented Dec. 30, 1924.

1,521,316

UNITED STATES PATENT OFFICE.

JOHN C. PELTON, OF PASADENA, CALIFORNIA.

APPARATUS FOR PRODUCING CONCRETE CASTINGS.

Application filed November 21, 1921. Serial No. 516,595.

*To all whom it may concern:*

Be it known that I, JOHN C. PELTON, a citizen of the United States, residing at Pasadena, in the county of Los Angeles and State of California, have invented new and useful Improvements in Apparatus for Producing Concrete Castings, of which the following is a specification.

My invention relates to the method of and apparatus for forming concrete brick or tile for use in building construction, and for other purposes.

My invention contemplates the method of forming a plurality of concrete bricks or tiles, in one operation, having a tempering material such as wet or moist sand interposed therebetween, in order that the concrete of which these products are made may be prevented from setting too quickly, the moist material between the products serving to temper and cure the same while drying, thereby eliminating all cracks or other imperfections which often occur in such products when allowed to dry and become set too quickly.

A further object of my invention contemplates the provision of a simple and efficient apparatus by which my method may be conveniently practiced, having a plurality of mold forms or patterns spaced apart and arranged in groups, adapted to be projected into a suitable molding flask to form molds, of the desired configuration, which may be filled with the plastic cement mixture, and the interstices therebetween filled with moist or wet tempering material; and also to provide means whereby said cement mixture and tempering material may be agitated in order that they will become properly packed.

Another object of my invention is to provide means whereby the plurality of finished products having the tempering material therebetween may be quickly and easily removed from the apparatus and laid aside to become tempered and cured, without the necessity of waiting for the cement mixture to become thoroughly set, thereby permitting the continuous operation of the apparatus without delays.

Other objects will appear in the following description, will be pointed out in the claims and will be embodied in the accompanying drawings, in which:

Fig. 1 is a plan view of an apparatus for molding the products and carrying out my process.

Fig. 2 is a vertical longitudinal section through the same, taken on the line 2—2 of Fig. 1.

Fig. 3 is a vertical transverse section of the same taken on the line 3—3 of Fig. 1.

Fig. 4 is a perspective view of a group of the molded products as they would appear after being removed from the apparatus and when in the process of becoming tempered and cured.

Fig. 5 is a perspective view of a form of tile which may be conveniently formed by my apparatus.

Fig. 6 is a plan view of two of the tiles placed together to illustrate how a hollow wall may be built up therewith.

Fig. 7 is a fragmental plan view of a modified construction of my apparatus.

Fig. 8 is a section of the same taken on the line 8—8 of Fig. 7, a piping system being shown in connection therewith for the purpose of applying moisture to the tempering material.

My apparatus comprises a frame 10 rectangular in shape and having the side rails 11 and 12, the end rails 13 and 14, and the transverse rails 15 and 16 arranged parallel with and spaced apart from the end rails 13 and 14, all of said rails being preferably formed of angle iron as shown in the drawings.

Depending from the rails 13 and 15, and 16 and 14 are members 17 and 18 to which are secured respectively the floats 19 and 20 supported on a fluid contained in the tanks 21 and 22 which are disposed below the frame 10. By this arrangement it will be obvious that the frame 10 will be buoyantly supported and will be adapted to rock and pitch when agitated.

In order that the frame 10 may be agitated to vibrate as above described, a motor 23 is suspended by means of the rods 24 from the frame 10, said motor being provided with unevenly balanced fly wheels 25, which when in motion will tend to jar the frame 10 on the fluid cushion.

Mounted to slide longitudinally on the rails 11 and 12 are the side wall members 26 and 27, and 28 and 29, the members 26 and 27 being adapted to overlap in order that they may be operated independently of each other, and the members 28 and 29 being adapted to overlap in the same manner.

Secured to the rails 15 and 16 are the wall members 30 and 31 which are provided with oppositely disposed slots 32 and 33 through which the oppositely disposed mold form or pattern members 34 and 35 are adapted to reciprocate, said members being joined together laterally by means of the angle irons 36 and 37, and longitudinally by means of the rack bar members 38.

In order that the mold form members 34 and 35 may be reciprocated longitudinally, the rack bars 38 are adapted to be engaged by the pinions 39 secured to a shaft 40 journaled in bearings mounted on side rails 11 and 12, the end of said shaft being provided with a suitable crank 41 as shown, by means of which the pinions 39 may be rotated.

Secured to the end rails 13 and 14 by means of the hinges 42 are the end wall members 43 and 44 which are adapted to be locked respectively to the members 26 and 28, and 27 and 29 by means of the latches 45.

By the above recited construction it will be seen that oppositely disposed molding flasks 46 and 47 are formed respectively by the wall members 26, 28, 30 and 46, and 27, 29, 31 and 44, and in order to form removable bottoms for said flasks, platforms or boards 48 and 49 having draining perforations 50 therein are provided and adapted to rest respectively upon the rails 11, 12, 13 and 15, and 11, 12, 14 and 16, as clearly shown in Figs. 2 and 3 of the drawings.

In the operation of the apparatus as described, the mold form members 35 are shown as projecting into the flask 47 and the mold form members 34 which are identical in construction are shown as out of the flask 46, which contains a plurality of the concrete brick castings 52 which have just been made and are ready to be removed from said flask. The frame 10 is agitated as previously described, by means of the motor 23, wet or moist sand 53 or other suitable tempering material is dumped in any desired manner into the flask 47 between the mold forms 35 and as it is agitated becomes packed solidly therebetween. After sufficient sand has been placed in the flask 47 it is leveled off in any suitable manner. While the sand in flask 47 is being agitated the latches 45 are disengaged from walls 26, 28 and 43, the wall 43 is then swung down on its hinge as shown in dotted lines in Fig. 2 and the walls 26 and 28 are then slid backwards, thus permitting the ready removal of the platform 40 and the casting, having the wet sand interposed therebetween, thereon, as clearly shown in Fig. 4 of the drawings, to be laid aside to dry and cure. After the platform 50 has been removed from the flask 46 another platform is placed in said flask and the walls thereof are once more locked together, the crank 41 is then manipulated to withdraw the mold 35 from flask 47 and project the mold form member 34 into flask 46, thus leaving a plurality of molds formed of moist or wet sand in flask 47, into which is poured the cement intended to form the castings, which is in turn agitated and packed as described. This operation may be repeated continuously, thus forming the products alternately in the flasks 46 and 47 without stopping or delaying the operation of the apparatus.

In Figs. 7 and 8 of the drawings I have shown an apparatus whereby the cement products may be formed in groups, each product being spaced apart from the other and the tempering material interposed between said products during the molding process. In this construction, which is designed more particularly for the molding of bricks, the flask is built up in the same manner as previously described and comprises the frame 10, the walls 26, 28, 43 and 30 and the removable platform 50. The rack bars 38 are provided with a cross head 60 to which is secured a plurality of thin blades or walls 61 spaced apart and adapted to slide through slots 62 formed in wall 30, thus forming a plurality of alternately disposed molding compartments 63 and tempering compartments 64. By this construction the cement mixture to form the bricks may be deposited into the compartments 63 and the tempering material, in either a dry or wet state, deposited into the compartments 64. After the cement mixture has become sufficiently compacted and set, the blades 61 may be withdrawn from the flask thus leaving the molded brick, having the tempering material interposed therebetween, on the platform 50, which may be removed from the flask as previously described.

If the tempering material is placed in the compartments in a dry state, said material may be moistened down by allowing water to trickle upon it from the nozzles 65 of water supply pipe 66, and after the blades 61 have been withdrawn said tempering material may be pressed against the surfaces of the bricks in any desired manner, thus serving as a medium for tempering and curing said brick after being removed from the apparatus.

By the above disclosure of my invention it will be obvious that I have provided a very effective method of forming a plurality of concrete products having a tempering material interposed therebetween whereby they will not be permitted to dry too quickly, thus providing a finished product completely cured, free from cracks and other imperfections, and possessing a strength superior to products made in the usual manner.

What I claim is:

1. An apparatus of the class described, comprising a buoyantly supported mold flask, means for projecting a mold form into and out of said flask, and means for agitating said flask.

2. An apparatus of the class described, comprising a pair of oppositely disposed buoyantly supported mold flasks, means for alternately projecting mold forms into said flasks, and means for agitating said flasks.

3. An apparatus of the class described, comprising a structure having a molding flask mounted thereon, and adapted to be supported buoyantly on a fluid, means for projecting a mold form into and out of said flask, and means for agitating said structure.

4. An apparatus of the class described, comprising a buoyantly supported mold flask provided with a removable bottom and movable walls, and means for projecting a plurality of mold forms into and out of said flask.

5. An apparatus of the class described, comprising a flask provided with a stationary wall having a plurality of slots formed therein, a pair of oppositely disposed slidably mounted walls, and a hinged wall disposed opposite said stationary wall, a removable bottom for said flask, a plurality of mold forms adapted to slide through the slots in said stationary wall and into and out of said flask, means for moving said mold form, and means for agitating said flask.

6. An apparatus of the class described, comprising a pair of oppositely disposed molding flasks having a removable bottom and side walls, a group of mold forms for each of said flasks joined together to move in unison, means for projecting said groups of mold forms alternately into and out of said flasks, a float adapted to support said structure on a fluid, and a flask vibrating mechanism.

In witness that I claim the foregoing I have hereunto subscribed my name this 10th day of November, 1921.

JOHN C. PELTON.